United States Patent [19]

Townsend et al.

[11] Patent Number: 4,544,899

[45] Date of Patent: Oct. 1, 1985

[54] CONTROLLED POWER LINE FILTERS FOR SUPPRESSING INTERFERENCE

[75] Inventors: Lionel B. K. Townsend; Mary D. Townsend, both of London, England

[73] Assignee: Brydor Limited, London, England

[21] Appl. No.: 533,580

[22] Filed: Sep. 19, 1983

[30] Foreign Application Priority Data

Sep. 20, 1982 [GB] United Kingdom ............. 8226669

[51] Int. Cl.⁴ ............................................. H03H 2/00
[52] U.S. Cl. .................................. 333/17 R; 333/12; 333/181
[58] Field of Search .............. 333/12, 17 R, 18, 181, 333/174; 361/113

[56] References Cited

U.S. PATENT DOCUMENTS

| | | | |
|---|---|---|---|
| 2,606,970 | 8/1952 | Scott | 333/174 X |
| 3,475,702 | 10/1969 | Ainsworth | 333/17 R |
| 3,644,847 | 2/1972 | Neuman | 333/174 X |
| 3,743,975 | 7/1973 | Kao | 333/18 |
| 4,095,163 | 6/1978 | Montague | |
| 4,156,838 | 5/1979 | Montague | |

FOREIGN PATENT DOCUMENTS

| | | |
|---|---|---|
| 3029697 | 7/1980 | Fed. Rep. of Germany . |
| 1390345 | 1/1973 | United Kingdom . |
| 1483896 | 11/1973 | United Kingdom . |
| 1510644 | 12/1974 | United Kingdom . |
| 2043971 | 3/1979 | United Kingdom . |
| 2026217 | 4/1979 | United Kingdom . |

OTHER PUBLICATIONS

Clark, Gregory A., "Cancel 60 Hz and Other Noise . . . ." *Electronic Design* 20, Sep. 27, 1976, pp. 74–49.

Cain, C. D. et al., A CCD Adaptive Filter with Coefficient Compensation of Change Transfer Loss", Proceedings of 5th International Conference on Charge-Coupled Devices, University of Edinburgh, Sep. 1979.

*Primary Examiner*—Paul Gensler
*Attorney, Agent, or Firm*—Maky, Renner, Otto & Boisselle

[57] ABSTRACT

A power line filter comprises a filter circuit in the form of an impedor assembly (30) that filters a network supply voltage to be applied to a load. A voltage sensor means (34) monitors a characteristic of the supply that is representative of the interference content of the supply voltage. A microprocessor (36) compares the monitored characteristic with data that is stored in a memory (38) and is representative of a desired supply characteristic. By way of control means (32), the microprocessor (36) cause variation of a filtration characteristic of the impedor assembly (30) in a sense to minimize any divergence between the two above-mentioned characteristics, thereby to better suppress the interference.

8 Claims, 5 Drawing Figures

CONTROLLED POWER LINE FILTERS FOR SUPPRESSING INTERFERENCE

BACKGROUND OF THE INVENTION

1. Field of the Invention

This invention relates to power line filters, that is to say filters capable of attenuating or suppressing interference present on an electrical network or mains supply to reduce the effect of such interference on equipment powered by the supply via the filter.

2. Description of the Prior Art

Mains electrical supply networks generally have interference voltages superimposed on the supply voltage proper. Interference voltages, which can be of a variety of natures and can arise from a variety of sources, can disturb the operation of, or even cause damage to, equipment fed by the supply, in particular sensitive electronic equipment such as, for instance, computers, electronic weighing machines, office machinery and so forth.

The presence of such interference voltages or mains or network supplies is, of course, well known and it is known to suppress them by means of power line filters, namely filters through which the power can be fed to the equipment and which are operative to filter out at least some of the interference to which the equipment may be subjected. A disadvantage of such power line filters is that a particular filter has a particular filtration characteristic. However, the particular nature of the interference present on the supply voltage to a particular power line filter cannot with accuracy be predicted since it may vary from time to time and since it may not be possible to specify (or at least specify with precision) the operating environment of a particular filter in advance. The effectiveness of the performance of a filter is dependent also upon other factors, such as, for instance, source and load impedances, which also cannot accurately be predicted since they may vary from time to time. In view of all this, the known power line filters are subject to the disadvantage that the filtration characteristics of a particular filter in a particular situation may at any time be far from optimum.

An object of the invention is to overcome or at least alleviate the above-mentioned disadvantage of the prior art power line filters.

SUMMARY OF THE INVENTION

According to the present invention there is provided a power line filter comprising a filter circuit, monitoring means for monitoring a characteristic of a network supply that is representative of the interference content of the network supply voltage, and a control arrangement responsive to the monitored characteristic of the supply to alter a filtration characteristic of the filter circuit in a sense adapting it to better suppress (if possible) the interference to which the network supply voltage is currently subjected. That is to say, the inventive power line filter can adapt its filtration characteristic in accordance with the interference that it currently encounters.

The control arrangement preferably comprises one or more microprocessors operative to compre the monitored characteristic of the supply with stored data representing a desired characteristic of the supply and operative to control the filtration characteristic to adapt the filtration characteristic to minimise (if possible) the difference between the monitored characteristic and the stored data. In one arrangement described hereinbelow, the monitoring means monitors the supply frequency, the stored data represents the actual frequency of the supply, and the microprocessor(s) is/are operative to alter the filtration characteristic in accordance with any difference between the monitored and actual frequencies. In another arrangement described hereinbelow, the monitoring means samples the supply voltage at regular intervals (thereby to monitor the actual waveform of the supply voltage), data representing the desired waveform of the supply voltage is stored, and the microprocessor(s) is/are operative to compare the sampled voltage with the stored waveform to cause variation of the filtration characteristic in a sense to minimise, if possible, any divergence between the actual and stored waveforms.

BRIEF DESCRIPTION OF THE DRAWINGS

Other objects, features and advantages of the invention will become apparent from the following description, given by way of illustrative and non-limiting example, with reference to the accompanying drawings, in which.

DESCRIPTION OF THE PREFERRED EMBODIMENTS

As mentioned above, electrical network or mains supply voltages are often subjected to interference. The interference, if not suppressed, can disturb or even damage sensitive equipment. Interference problems can be caused by asymmetrical interference (common mode/electromagnetic interference-EMI) which is carried by the network between one or both poles and earth and distributed throughout the network. Interference problems also can be caused by symmetrical interference (differential mode/radio frequency interference-RFI) which is caused by external sources and impressed on the network by induction. Voltage "spikes" can for example be caused by atmospheric electricity or lightning. Interference voltages can also be caused by switching transients, for instance surges in the form of voltage rises created by disconnecting inductive circuits, thus releasing stored inductive energy which tries to maintain the existing current, giving rise to a substantially instantaneous voltage increase in the attempt. Interference in the form of "spikes" can also be caused by switching devices such as thyristors and triacs used for heavy current switching, generally at a frequency of more than once per cycle. Different forms of interference have different frequency spectra and energy contents. All of them change the form of the nominally sinusoidal supply voltage and can therefore be viewed as an alteration in the frequency or frequency spectrum of the supply voltage.

Various forms of load to be supplied via a mains power supply can be disturbed or even damaged by interference voltages superimposed on the supply voltage. It is often not possible to suppress or sufficiently to suppress the interference at source, whereby in the case of sensitive equipment it becomes necessary to suppress the interference where it is supplied to the sensitive equipment by supplying the equipment via a power line filter. A power line filter can be of a variety of types. It may, by way of illustrative and non-limiting example, comprise one or more impedors, that is reactors (inductors or capacitors) and resistors; and may be active and/or passive. Typically, a power line filter will be of Bessel, Butterworth or Chebyshev configuration, though any other configuration may be employed.

Figure 1:
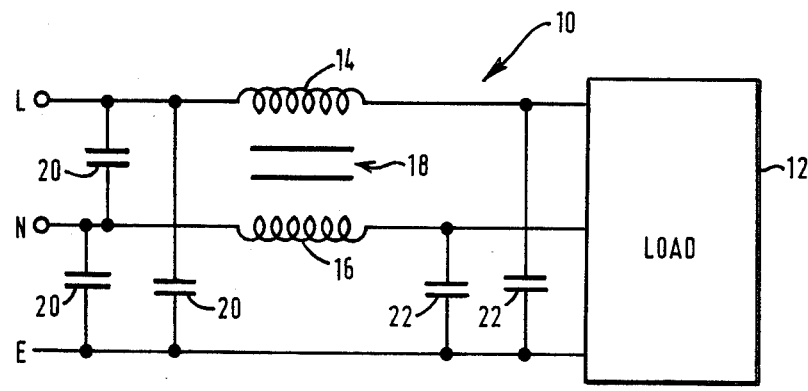
FIG. 1 shows a typical, known power line filter.

An exemplary and typical configuration for a passive power line filter is shown in FIG. 1 of the accompanying drawings, the filter 10 being connected between live (phase) and neutral terminals L,N of the supply voltage and a load 12 to be powered by the supply voltage. The input terminals L and N are connected to respective separate coils 14, 16 which may be wound on separate cores of appropriate magnetic permeability or, as shown, on a common core inductor 18. (Alternately, the coils 14, 16 may not be wound on cores). Respective capacitors 20 are connected between the input terminals L and N, between the terminal N and an earth or ground conductor E, and between the input terminal L and the earth conductor E. Further capacitors 22 are connected downstream of the inductor 18 between the live and neutral poles and between the neutral pole and earth. The earth conductor E is connected from the input of the filter to the output, where it is again earthed. The filter 10 may have a metal casing and, if so, the earth conductor may be connected thereto.

Figure 2:
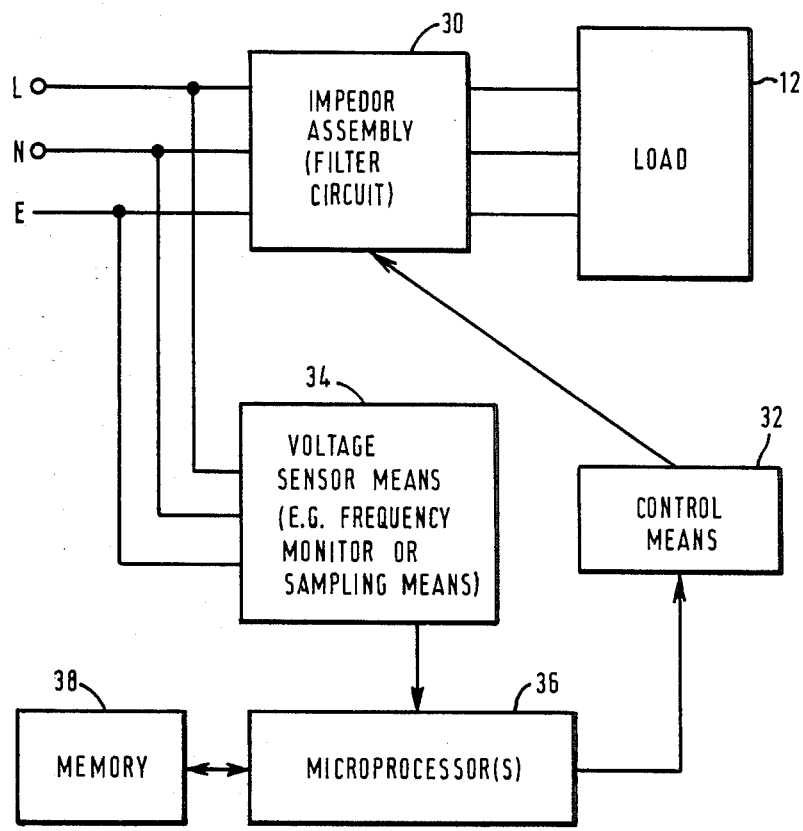
FIG. 2 is a block diagram of a power line filter embodying the present invention.

In a power line filter embodying the invention and shown in FIG. 2, exact reciprocal alignment of impedors (preferably capacitors, or resistors and inductors) is effected to provide the best form of protection. In the arrangement shown in FIG. 2, input terminals L and N and a load 12 are interconnected by a filter circuit which, in the illustrated arrangement, is an impedor assembly 30 that, by way of example, comprises filter elements in the form of capacitors and/or resistors and/or inductors or any other suitable component.

The impedor assembly 30 is controllable by way of a control means 32 so that a filtration characteristic, e.g. bandwith or cut-off frequency, may be altered. The filter circuit embodied in the impedor assembly may be of that circuit configuration generally shown in FIG. 1, but any other circuit configuration can be adopted.

According to one form of implementation of the impedor assembly 30, alteration of the filtration characteristic thereof may be attained by switching between the components (e.g. capacitors and/or inductors and/or resistors and/or other components) thereof. For example, referring to FIG. 3, suppose that the filter circuit configurations embodied in the impedor assembly 30 includes a branch consisting of or including a capacitor C1. The filtration characteristic could then, for instance, by changed by switching in, in place of the capacitor C1, another capacitor C2 of different capacitance to the capacitor C1, such switching being effected by a switch S controlled by the control means 32, which in this case would be a switching control means. In like manner, the filtration characteristic could be changed by switching between different inductors and/or resistors and/or other components. Further, additionally or alternatively, the filtration characteristic of the impedor assembly 30 could be changed by switching the components thereof (by way of the switching control means 32) between different circuit configurations having different filtration characteristics by changing the manner of interconnection of the components.

According to another form of implementation of the impedor assembly 30, the alteration in the filtration characteristic thereof may be attained by varying or altering a value of one or more of the components (e.g. capacitors and/or inductors and/or resistors and/or other components thereof). For example, referring to FIG. 4, suppose that the filter circuit of the impedor assembly 30 includes a branch consisting of or including a variable capacitor C3. That filter circuit could then, for instance, be changed to have a different filtration characteristic by varying the capacitance of the capacitor C3. To this end, the capacitor C3 might be a voltage sensitive capacitor and the control means 32 might comprise a variable voltage supply for changing the capacitance of the capacitor C3 (continuously or step-wise) by altering a voltage applied thereto. In like manner, the filtration characteristic could be changed by altering the resistance of a resistor and/or the inductance of an inductor and/or a value of some other component.

Figure 3:
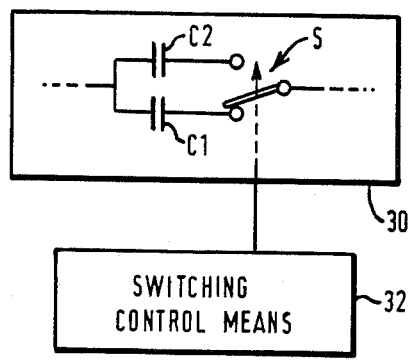
FIGS. 3 and 4 show respective different ways of implementing part of the arrangement shown in FIG. 2.
Figure 4:
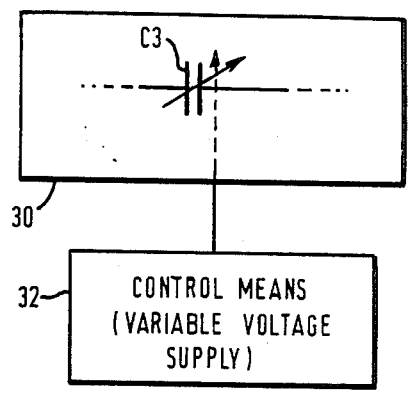

The techniques described with reference to FIGS. 3 and 4 can be combined. That is to say, the filtration characteristic of the impedor assembly 30 could be changed by switching between the components thereof, altering a value of one or more components thereof, or both, as appropriate.

Reverting now to FIG. 2, the arrangement shown therein is operative to compare a monitored characteristic of the supply voltage (using for example a fast Fourier transform such as for instance the Cooley-Turkey algorithm or one of its derivatives) with an ideal or desired form of such characteristic of the supply voltage and is responsive to any divergence between them to alter the filtration characteristic of the impedor assembly 30 to select a characteristic that is best suited to minimise devergence between the monitored and actual values. To this end, the circuit shown in FIG. 2 comprises a voltage sensor or monitoring means 34 that monitors the supply voltage, one or more microprocessors 36 receiving data from the voltage sensor means 34, and a memory 38. The memory 38 stores data representing the desired characteristic of the supply voltage, data instructing the microprocessor(s) 36 how to alter the filtration characteristic (if at all) in the event of different characteristics of the supply voltage divergent from the desired characteristic, and a program for operating the microprocessor(s). The microprocessor(s) 36 is/are responsive to the stored data and the data from the voltage sensor means 34 to cause the control means 32 to be operative on the impedor assembly 30 to cause the latter to adopt the best possible filtration characteristic.

The arrangement described with reference to FIG. 2 may operate in accordance with a variety of techniques. Two such techniques are described below by way of example.

In accordance with one operating technique, the voltage sensor means 34 comprises means to monitor the supply voltage frequency. Such means comprises an electronic oscillator for counting the number of half-cycles per second of the supply voltage waveform. In the oscillator, in a manner analogous to a metronome, a capacitor is charged as the current arrives and then discharges, but the discharge is impeded by an inductor so, until a half cycle of current has passed, it cannot complete the swing. Each swing can be counted. The number of half-cycles is, ideally, equal to one hundred per second in the case of a 50 Hz supply frequency, or 120 per second in the case of a 60 Hz supply frequency, and is stored in the memory 38. If the voltage sensor means 34 detects a frequency of 50 Hz (or 60 Hz), whereby the microprocessor(s) 36 detects/(detect) no difference between the stored and monitored frequencies, the filtration characteristic is not changed. If, however, the monitored and stored frequencies do not agree, the micrprocessor(s) is/are operative in accordance with stored instructions to select a different filter characteristic by switching component interconnections and/or altering one or more component values in the impedor assembly 30, as described above with reference to FIGS. 3 and 4. A different such characteristic is for example selected for each possible measured frequency value or range of values, the effect being to modify the filtration characteristic as appropriate to minimise any difference between the monitored and actual frequencies and therefore to minimise the interference passed through to the load 12.

In accordance with another operating technique for the power line filter of FIG. 2, the memory 38 stores data in the form of a "grid" representing a preferred waveform. That is to say, the memory 38 stores—possibly in the form of a "look-up table"—a piecewise approximation to a sinusoidal waveform like points on a piece of graph paper having (say) 256 time positions per cycle and (say) 256 amplitude positions per cycle. The voltage sensor means 34 includes sampling means operative to sample the amplitude of the supply voltage waveform at predetermined instants at like intervals of, say, 256 times per cycle and to therefore produce a stream of data that represents the actual form of the supply voltage in a manner analogous to that stored by the memory 38 for the ideal waveform. The microprocessor(s) 36 is/are operative to compare the stored data with the data from the voltage sensor means 34 and, in a manner described above for the previous technique, is operative to change to a different filtration characteristic if the stored and actual waveforms differ by more than a predetermined amount. For example, if at a particular one or more sample points the magnitude of the voltage is greater or less than it should be, the filtration characteristic will be changed in accordance with instructions stored in the memory 38. Thus, the incoming supply voltage is monitored and any alteration is "read" by the arrangement of FIG. 2, the microprocessor(s) 36 then directing the current through the most suitable combination of, for example, capacitors and inductors to filter out a detected "spike" or other interference.

Figure 5:
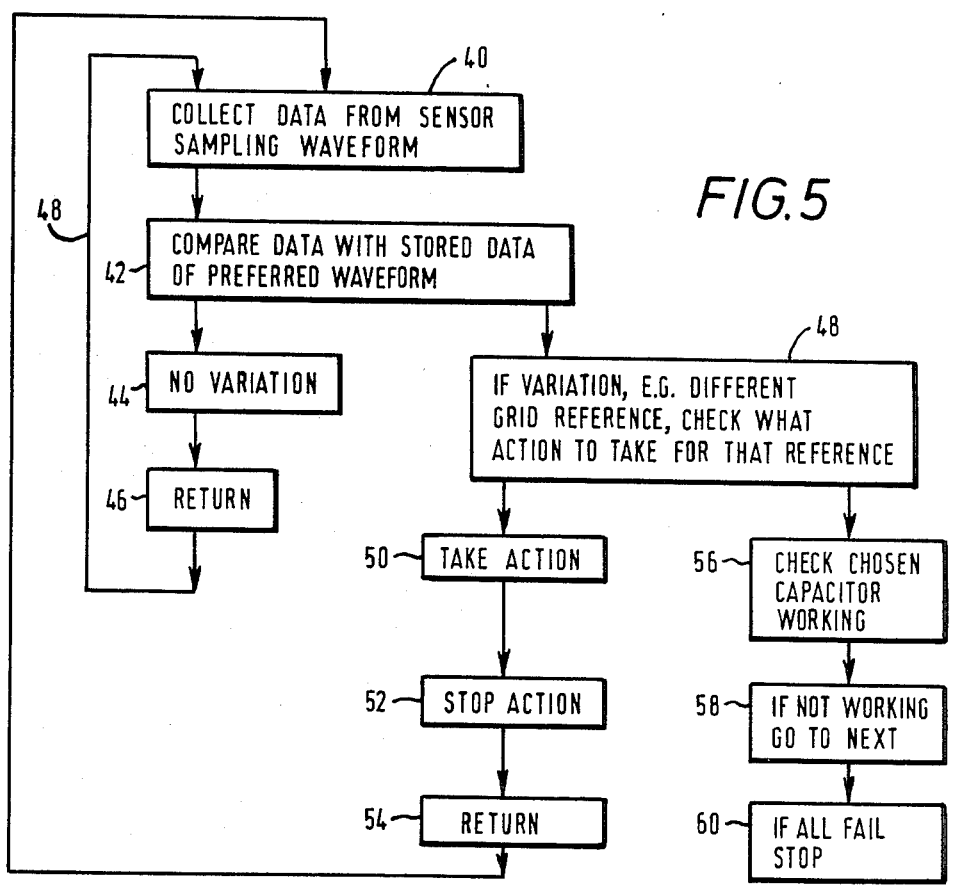
FIG. 5 is a flow diagram of a procedure that may be followed by a microprocessor or microprocessors of the filter shown in FIG. 2.

The operation of the circuit of FIG. 2 in accordance with the above-described second technique is illustrated in more detail in the form of a flow diagram in FIG. 5. As mentioned above, and as can be seen from blocks 40, 42, 44, 46 and loop 48, provided the monitored supply voltage agrees with data stored in the memory 38 and representing the preferred waveform, the filter characteristic is not varied. If there is a variation (block 48), the microprocessor(s) 36 consults/(consult) the memory 38 to see what action should be taken as regards changing the filter characteristic for that particular difference. It then takes the action (block 50), stops it (block 52) and then returns (block 54) to collecting and comparing data. The flow diagram also includes a capacitor check routine represented by blocks 56, 58, 60, whereby in the event of a change in filtration characteristic involving the use of a chosen or selected capacitor that capacitor is checked (block 56), another capacitor is selected (block 58) if the initially selected capacitor is not working, and in the event of total failure (block 60) the operation of the power line filter is stopped.

It should be noted that, as well as filtering interferences on the network supply voltage that would otherwise be passed to the load, the power line filters described herein will function also to filter interference travelling in the opposite direction, that is from the load to the supply.

We claim:

1. A power line filter comprising:
 a filter circuit for connection to a network supply, the filter circuit having a filtration characteristic that can be altered;
 monitoring means for monitoring a characteristic of the network supply which characteristic is representative of the interference content of the network supply; and
 a control arrangement connected to said monitoring means and to said filter circuit, said control arrangement comprising means responsive to said monitored characteristic of the network supply to alter said filtration characteristic of said filter circuit in a sense to adapt said filtration characteristic to better suppress the interference to which the input network supply is currently subjected, said control arrangement comprising memory means storing data representing a desired network supply characteristic, and at least one microprocessor connected to said monitoring means and to said memory means, said at least one microprocessor being operative to compare said monitored characteristic with said stored data and to cause alteration of said filtration characteristic of said filter circuit in a sense to minimize any difference between said monitored characteristic and said stored data.

2. A power line filter according to claim 1, wherein said data stored by said memory means comprises a desired network supply frequency, said monitoring means comprises means to monitor the actual supply frequency, and said at least one microprocessor is operative to cause alteration of said filtration characteristic of said filter circuit in a sense to minimise any difference between said desired and actual frequencies.

3. A power line filter according to claim 1, wherein said data stored by said memory means comprises data representing a desired network supply voltage waveform, said monitoring means comprises means to sample the amplitude of the network supply voltage at predetermined instants, and said at least one microprocessor is operative to compare the samples with said stored data and to cause alteration of said filtration characteristic of said filter circuit in a sense to minimise any divergence between the samples and the stored data.

4. A power line filter according to claim 1, wherein said filter circuit comprises a plurality of filter elements and said control arrangement comprises means to alter said filtration characteristic by switching between said filter elements.

5. A power line filter according to claim 1, wherein said filter circuit comprises a plurality of filter elements, at least one of said filter elements is of variable value, and said control arrangement comprises means to alter said filtration characteristic by altering the value of said at least one filter element.

6. A power line filter according to claim 1, wherein said filter circuit comprises a plurality of filter elements, at least one of said filter elements is of variable value, and said control arrangement comprises means to alter said filtration characteristic by altering the value of said at least one filter element and means to alter said filtration characteristic by switching between said filter elements.

7. A power line filter according to claim 1, wherein said characteristic monitored by said monitoring means comprises the network supply frequency.

8. A power line filter according to claim 1, wherein said characteristic monitored by said monitoring means comprises the shape of the network supply voltage waveform.

* * * * *